United States Patent
Shriram et al.

(10) Patent No.: US 11,393,176 B2
(45) Date of Patent: Jul. 19, 2022

(54) VIDEO TOOLS FOR MOBILE RENDERED AUGMENTED REALITY GAME

(71) Applicant: Krikey, Inc., Menlo Park, CA (US)

(72) Inventors: Ketaki Lalitha Uthra Shriram, San Francisco, CA (US); Jhanvi Samyukta Lakshmi Shriram, San Francisco, CA (US); Yusuf Olanrewaju Olokoba, Hanover, NH (US); Luis Pedro Oliveira da Costa Fonseca, Oporto (PT)

(73) Assignee: Krikey, Inc., Menlo Park, CA (US)

( * ) Notice: Subject to any disclaimer, the term of this patent is extended or adjusted under 35 U.S.C. 154(b) by 0 days.

(21) Appl. No.: 17/170,629

(22) Filed: Feb. 8, 2021

(65) Prior Publication Data

US 2021/0245043 A1 Aug. 12, 2021

Related U.S. Application Data

(60) Provisional application No. 62/971,766, filed on Feb. 7, 2020.

(51) Int. Cl.
*A63F 9/24* (2006.01)
*A63F 13/00* (2014.01)
(Continued)

(52) U.S. Cl.
CPC ............ *G06T 19/006* (2013.01); *A63F 13/25* (2014.09); *A63F 13/537* (2014.09); *G06K 9/6267* (2013.01); *G06N 20/00* (2019.01); *G06T 7/50* (2017.01); *G06T 7/75* (2017.01); *G06T 15/205* (2013.01); *A63F 2300/8082* (2013.01); *G06F 3/017* (2013.01); *G06T 2200/24* (2013.01); *G06T 2207/20081* (2013.01); *G06T 2210/21* (2013.01)

(58) Field of Classification Search
CPC ........ A63F 13/25; A63F 13/52; A63F 13/537; A63F 13/60; G06T 19/006; G06T 7/50; G06T 7/75; G06T 15/205; G06N 20/00; G06K 9/6267
See application file for complete search history.

(56) References Cited

U.S. PATENT DOCUMENTS

10,755,103 B2 * 8/2020 Chang ................. H04N 21/2187
10,796,489 B1 * 10/2020 Cordes ................ H04L 65/4076
(Continued)

*Primary Examiner* — Milap Shah
*Assistant Examiner* — Jason Pinheiro
(74) *Attorney, Agent, or Firm* — Fenwick & West LLP (57) ABSTRACT

A video is generated based on a user's interactions with an augmented reality (AR) client in an AR system. The AR system uses machine learning models to determine content within the images of the user's interactions (e.g., gameplay of an AR game) and the quality of the images (e.g., based on features of the images such as brightness, contrast, particular AR objects, behaviors of AR objects, etc.). A first machine learning model is applied to identify content within the images (e.g., the presence of an AR object). The AR system selects a first subset of the images to which the system applies a second machine learning model that classifies a quality score for each image. The AR system generates a video using a second subset of the image frames classified by the second machine learning model (e.g., a gameplay highlight video showing the user interacting with AR objects).

20 Claims, 6 Drawing Sheets

(51) Int. Cl.
  *G06F 17/00* (2019.01)
  *G06T 19/00* (2011.01)
  *G06T 7/73* (2017.01)
  *G06T 15/20* (2011.01)
  *G06T 7/50* (2017.01)
  *A63F 13/537* (2014.01)
  *G06N 20/00* (2019.01)
  *G06K 9/62* (2022.01)
  *A63F 13/25* (2014.01)
  *G06F 3/01* (2006.01)

(56) References Cited

U.S. PATENT DOCUMENTS

| | | | |
|---|---|---|---|
| 11,266,915 B2 * | 3/2022 | Myhill | H04N 21/23424 |
| 2020/0310623 A1 * | 10/2020 | Hutten | A63F 13/213 |
| 2020/0312003 A1 * | 10/2020 | Borovikov | G06T 13/40 |
| 2021/0027531 A1 * | 1/2021 | Liu | A63F 13/80 |
| 2021/0275908 A1 * | 9/2021 | Amer | G06T 7/215 |
| 2021/0304355 A1 * | 9/2021 | Delattre | G06T 3/4046 |
| 2021/0397846 A1 * | 12/2021 | Chang | H04N 21/251 |

* cited by examiner

VIDEO TOOLS FOR MOBILE RENDERED AUGMENTED REALITY GAME

CROSS REFERENCE TO RELATED APPLICATIONS

This application claims the benefit of U.S. Provisional Application No. 62/971,766, filed Feb. 7, 2020, which is incorporated by reference in its entirety.

TECHNICAL FIELD

The disclosure generally relates to the field of mobile rendered augmented reality and more specifically to video classification and generation in mobile rendered augmented reality environments.

BACKGROUND

While using an augmented reality (AR) client (e.g., an AR game), a user may want to play back the interactions they have made with an AR object. In particular, the user may want to avoid playing back portions of their interactions that lack particular content (e.g., the user's hand or AR objects) or were of relatively poor quality (e.g., an object briefly blocked the AR object from the user's view or the user traveled to a poorly lit room and the images are insufficiently bright). For example, in the context of AR gaming user may want access to a video highlighting particular moments of his gameplay. Conventional implementations for mobile clients do not allow for the generation of a video based on classifications of content and quality within the image frames. Furthermore, classification of images and videos on a mobile device can be taxing to the limited memory, processing, and power resources available on such devices. Accordingly, generating videos, such as gameplay highlight videos, for AR systems on mobile clients is challenging.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In one example embodiment of a disclosed system, method and computer readable storage medium, a video is generated based on images depicting a user's interactions with an augmented reality (AR) client. In particular, machine learning models are used to determine content within the images and the quality of the images (e.g., based on features of the images such as brightness, contrast, particular AR objects, behaviors of AR objects, etc.). A first machine learning model is applied to identify content within the images (e.g., the presence of an AR object), image frames that lack particular content may be discarded, and the remaining images are input to a second machine learning model that classifies the remaining images based on their quality. By discarding frames and not applying the second machine learning model to all frames, the system described herein optimizes for the memory, processing, and consequentially, power resources of a device such as a mobile client that is limited in such resources. A video is generated using a subset of the image frames classified by the second machine learning model (e.g., a video generated based on frames with the highest quality as classified by the model). Conventional AR systems lack the classification and video generation functionalities to process the user's interactions with an AR client to generate the video (e.g., a highlight video of the AR experience). Accordingly, described is a configuration that enables classification of content and quality in images depicting a user's interaction with an AR client and generation of a video from the classified images while optimizing for the power, memory, and processing constraints of a mobile client.

In one example configuration, a camera coupled with the mobile client (e.g., integrated with the mobile client or wirelessly or wired connection with the mobile client) captures images of an environment. The environment may correspond to the physical world, which includes an object that may be positioned with a field of view of the camera. A processor (e.g., of the mobile device) processes program code that causes the processor to execute specified functions as are further described herein. The processor may provide an AR object for display on the mobile device such that the composite of the AR object and the environment is displayed. The processor may receive image frames that include the image data displayed on the mobile device. The processor applies a first machine learning model to the received image frames, where the first machine learning model is configured to classify objects in an image frame (e.g., real-world objects and/or AR objects). The processor determines a first subset of image frames to which it applies a second machine learning model, where the second machine learning model is configured to classify image frames based on quality scores (e.g., assigns a quality score to each image frame). The processor selects a second subset of image frames based on the second machine learning model's classifications and generates a video based on the second subset of image frames.

Augmented Reality System Environment

Figure 1:
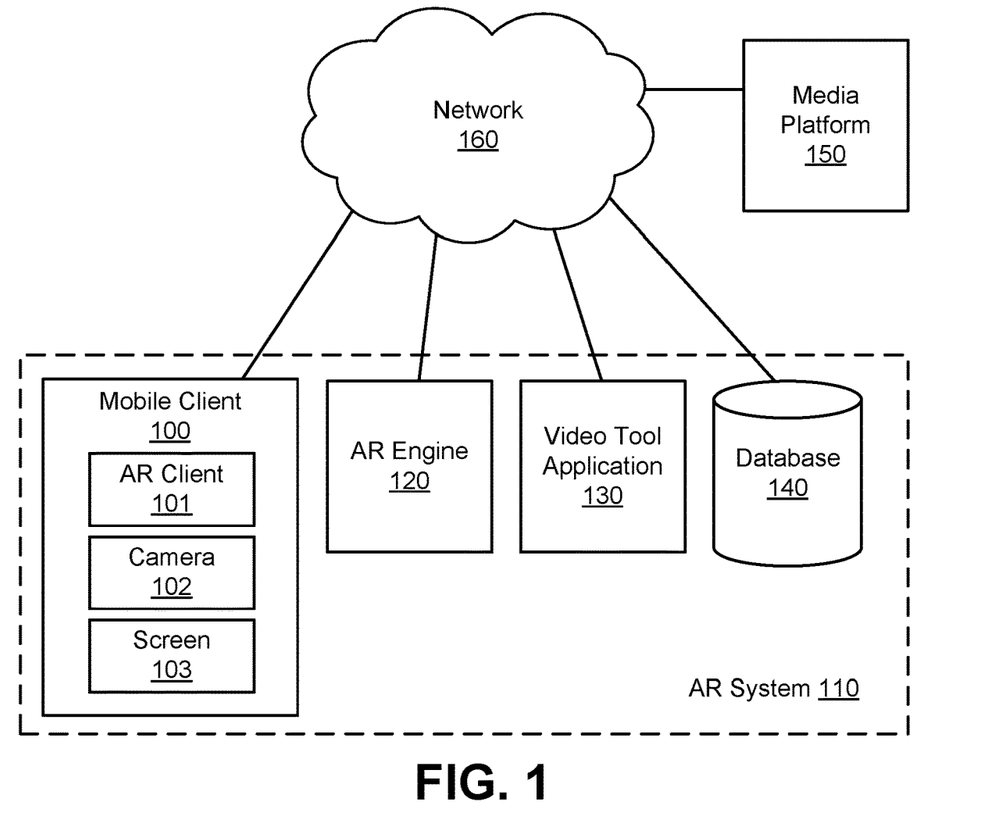
FIG. 1 illustrates an augmented reality (AR) system environment, in accordance with at least one embodiment.

Figure (FIG. 1 illustrates one example embodiment of an augmented reality (AR) system environment, in accordance with at least one embodiment. The AR system environment enables AR applications on a mobile client 100, and in some embodiments, presents video generation tools to users via machine-learned classification. The system environment includes a mobile client 100, an AR system 110, an AR engine 120, a video tool application 130, a database 140, a media platform 150, and a network 160. The AR system 110, in some example embodiments, may include the mobile client 100, the AR engine 120, the video tool application 130, and the database 140. In other example embodiments, the AR system 110 may include the AR engine 120, the video tool application 130, and the database 140, but not the mobile client 100, such that the AR system 110 communicatively couples (e.g., wireless communication) to the mobile client 100 from a remote server. While the media platform 150 is shown as independent of the AR system 110 (e.g., managed by a third-party), in some embodiments, the AR system 110 may include the media platform 150 such that the AR system 110 manages the media platform 150.

The mobile client 100 is a mobile device that is or incorporates a computer. The mobile client may be, for example, a relatively small computing device in which network processing (e.g., processor and/or controller) and power resources (e.g., battery) may be limited and have a formfactor size such as a smartphone, tablet, wearable device (e.g., smartwatch) and/or a portable internet enabled device. The limitations of such device extend from scientific principles that must be adhered to in designing such products for portability and use away from constant power draw sources.

Figure 7:
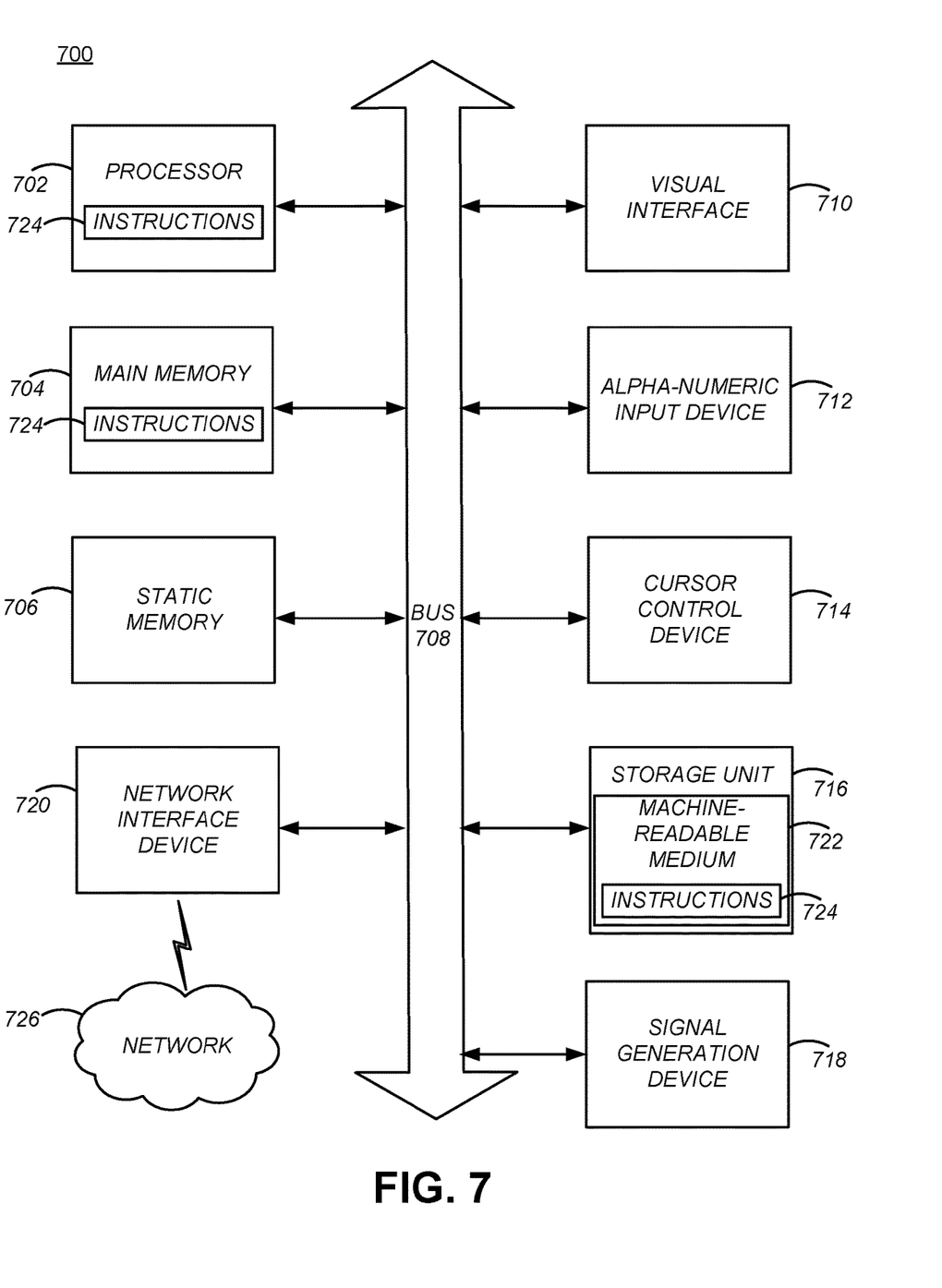
FIG. 7 illustrates a block diagram including components of an example machine able to read instructions from a machine-readable medium and execute them in a processor (or controller), in accordance with at least one embodiment.

The mobile client 100 may be a computing device that includes the components of the machine depicted in FIG. 7. The mobile client 100 has general and/or special purpose processors, memory, storage, networking components (either wired or wireless). The mobile client 100 can communicate over one or more communication connections (e.g., a wired connection such as ethernet or a wireless communication via cellular signal (e.g., LTE, 5G), WiFi, satellite) and includes a global positioning system (GPS) used to determine a location of the mobile client 100. The mobile client 100 also includes a screen 103 (e.g., a display) and a display driver to provide for display interfaces on the screen 103 associated with the mobile client 100. The mobile client 100 executes an operating system, such as GOOGLE ANDROID OS and/or APPLE iOS, and includes a screen 103 and/or a user interface that the user can interact with. The mobile client 100 also includes one or more cameras 102 that can capture forward and rear facing images and/or videos. In some embodiments, the mobile client 100 couples to the AR system 110, which enables it to execute an AR application (e.g., the AR client 101).

The AR engine 120 executes an AR application (e.g., an AR game). For example, the AR engine 120 may be a game engine such as UNITY and/or UNREAL ENGINE. The AR engine 120 displays, and the user interacts with, the AR game via the mobile client 100. For example, the mobile client 100 may host and execute the AR client 101 that in turn accesses the AR engine 120 to enable the user to interact with the AR game. Although the AR application refers to an AR gaming application in many instances described herein, the AR application may be a retail application integrating AR for modeling purchasable products, an educational application integrating AR for demonstrating concepts within a learning curriculum, or any suitable interactive application in which AR may be used to augment the interactions. In some embodiments, the AR engine 120 is integrated into and/or hosted on the mobile client 100. In other embodiments, the AR engine 120 is hosted external to the mobile client 100 and communicatively couples to the mobile client 100 over the network 160. The AR system 110 may comprise program code that executes functions as described herein.

In some example embodiments, the AR system 110 includes the video tool application 130. The video tool application 130 enables video generation for AR applications. The video tool application 130 may classify portions of a user's interactions with an AR application and aggregates the classified portions into a video. For example, data representing a user's gameplay with an AR gaming application may be stored (e.g., by the mobile client 100) and the video tool application 130 classifies image frames based on content within the frames and/or quality of the frames. The classified content may include real-world objects (e.g., the user's hands) and/or AR objects (e.g., an AR ball).

Quality may be classified according to measurable features of an image frame (e.g., brightness, contrast, etc.) or user-determined features as aggregated from users (e.g., players of a game who watch and score the quality of generated AR gameplay videos). In some embodiments, measurable features include the relative size or behavior of an AR object as depicted within image frames. For example, an image frame depicting an AR ball as larger relative to other objects in the frame (e.g., closer to the user) may be scored with a higher quality score than an image frame depicting the AR ball smaller relative to other objects in the frame (e.g., farther away). The video tool application 130 may determine correlations between user-provided quality scores and image frames to determine measurable features for use in determining a quality score for classification. For example, users may provide relatively high quality scores for image frames depicting a popular AR object and the video tool application 130 may determine to classify image frames depicting the AR object as having a high quality score. Quality scores may be a numerical score (e.g., a score of "1" may be the highest quality while a score of "3" may be the lowest quality).

In some embodiments, quality scores may be associated with at least one of a presence of a real-world object in a given image frame or consecutive image frames of a video, a presence of an AR object in a given image frame or consecutive image frames of a video, or a distance between a real-world object and an AR object in a given image frame or consecutive image frames of a video. The distance may be determined by the video tool application 130 using techniques such as clustering of feature points of an image frame, generating a three-dimensional (3D) virtual coordinate space using the feature points, and determining the distance within the 3D virtual coordinate space between feature points corresponding to the AR object and the real-world object.

The user captures an image and/or video of an environment captured within a camera view of the camera 102 of the mobile client 100. The environment includes real-world objects such as people, the user (e.g., the user's hand), furniture, buildings, etc. The images or video may capture the environment and exclude AR objects rendered by the AR engine 120. These images or videos excluding a composited layer of AR may be referred to herein as a "raw image" or "raw video." The composite images or videos combining AR and raw image layers may be presented to the user during execution of the AR client 101 (e.g., via the screen 103). Images or videos depicting user interactions with the AR client 101 may include the composite images or videos. In some embodiments, the video tool application 130 may provide a layer of AR that is composited onto the raw images or videos to the mobile client 100 for presentation to the user (e.g., during execution of the AR client 101). The layer of AR may include one or more AR objects rendered by the AR engine 120.

Figure 5:
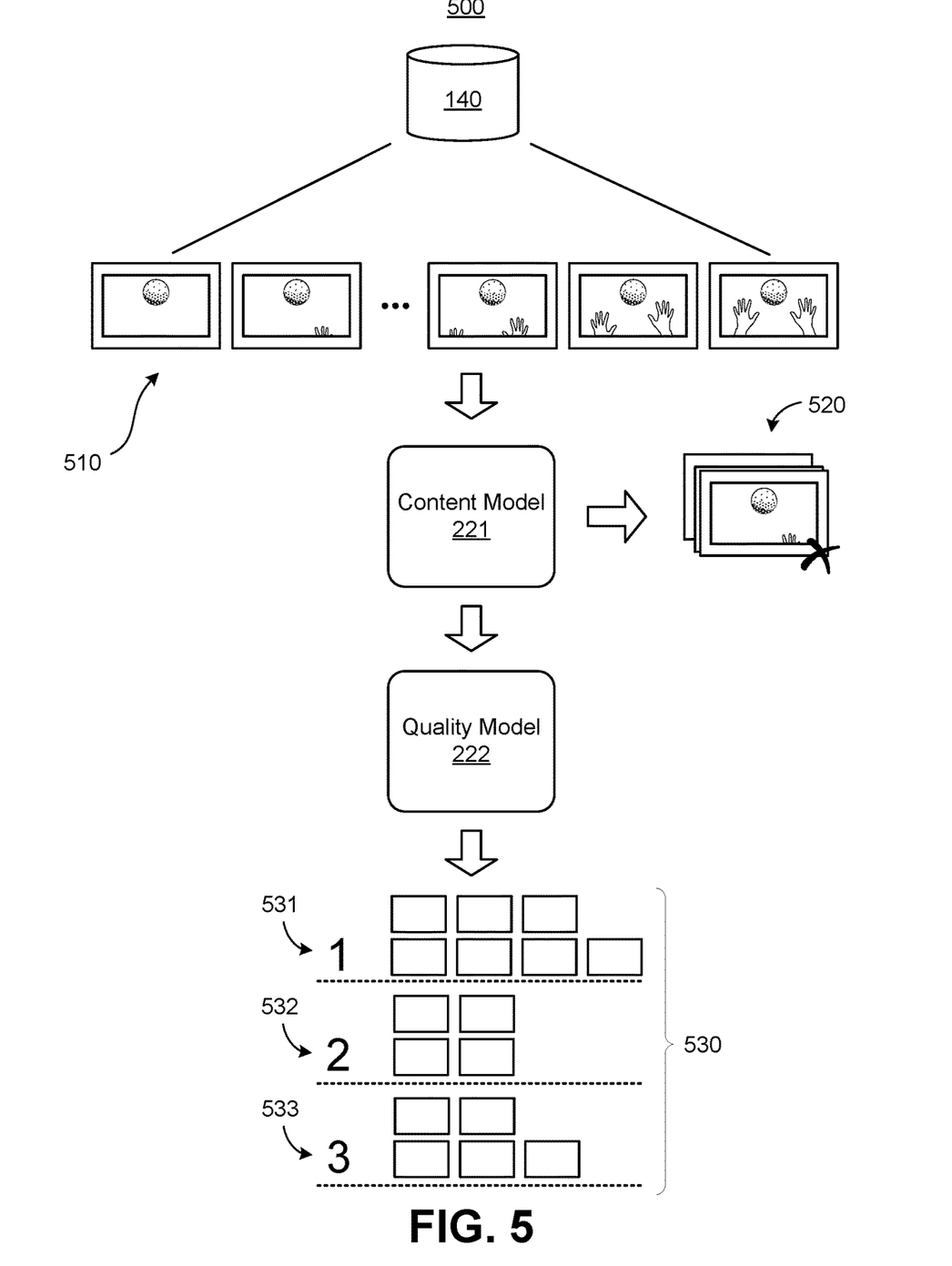
FIG. 5 illustrates an example of video classification in an AR system, in accordance with at least one embodiment.
Figure 6:
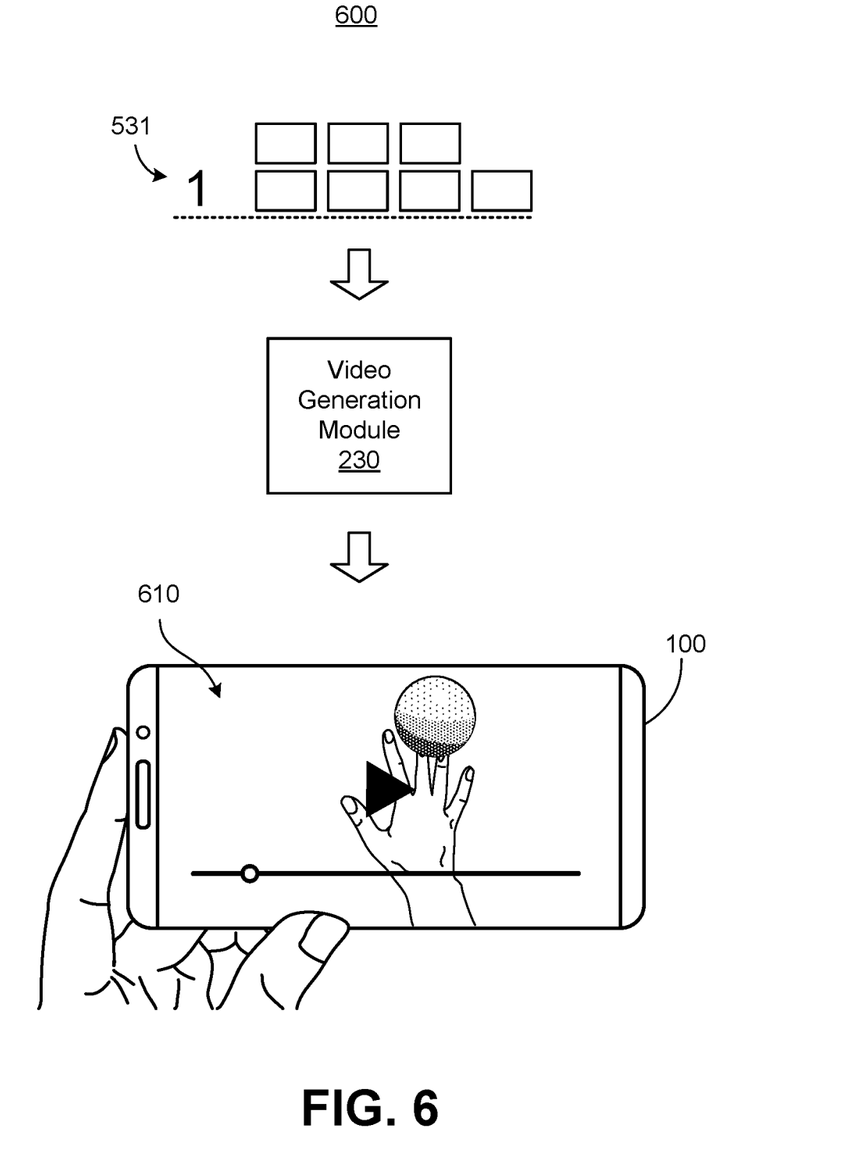
FIG. 6 illustrates an example of video generation in an AR system, in accordance with at least one embodiment.

During or after the use of the AR client 101, the video tool application 130 classifies image frames capturing the user's interactions with the AR client 101, and then generates a video based on the classified image frames (e.g., using a subset of the frames classified with high quality scores). In some embodiments, the functionality of the video tool application 130 may be performed during the use of the AR client 101 such that the image data the user is seeing on the mobile client 100 is being displayed at the 103 at substantially the same time as it is processed by the video tool application 130 to provide a video to the user when he stops using the AR client 101. By processing the image frames at substantially the same time as they are being displayed, the video tool application 130 may decrease the time that the user must wait after he stops using the AR client 101 to view the generated video. FIGS. 5 and 6, described further herein, provide further details on video classification and generation in the AR system 110. In some embodiments, the AR system 110 includes applications instead of and/or in addition to the video tool application 130. In some embodiments, the video tool application 130 may be hosted on and/or executed by the mobile client 100. In other embodiments, the video tool application 130 is communicatively coupled to the mobile client 100.

The database 140 stores images or videos that may be used by the video tool application 130 to classify image frames depicting a user's interactions with the AR client 101. The mobile client 100 may transmit images or videos collected by the camera 102 during the execution of the AR client 101 to the database 140. In some embodiments, the video tool application 130 may provide a layer of AR that is composited onto the raw images or videos to the database 140 for storage. The database 140 may store user data such as user profiles or user-specified quality scores for images or videos depicting user interactions with the AR client 101.

The data stored within the database 140 may be collected from a single user (e.g., the user of the mobile client 100) or multiple users (e.g., users of other mobile clients that are communicatively coupled to the AR system 110 through the network 150). The video tool application 130 may use images and/or videos of user interactions with the AR client 101 and user-specified quality scores stored in the database 140 to train machine learning models. In particular, the machine learning model training engine 210 of the video tool application 130 may access the database 140 to train machine learning models that classify content and quality, respectively. This is described in further detail in the description of FIG. 2.

The media platform 150 is a computer system that shares content (e.g., images and videos) with mobile clients (e.g., the mobile client 100). In some embodiments, the media platform 150 provides social networking content to users, enabling users of mobile clients to upload videos generated by the video tool application 130 for viewing or downloading by users of other mobile clients over the network 160. The media platform 150 may receive user-specified scores (e.g., quality scores), from the mobile client 100, for the videos or image frames within the videos accessible at the media platform 150. The media platform 150 or the mobile client 100 may provide the user-specified scores to the database 140 for storage or to the video tool application 130 for training a machine learning model.

The network 160 transmits data between the mobile client 100 and the AR system 110. The network 160 may be a local area and/or wide area network that uses wired and/or wireless communication systems, such as the internet. In some embodiments, the network 160 includes encryption capabilities to ensure the security of data, such as secure sockets layer (SSL), transport layer security (TLS), virtual private networks (VPNs), internet protocol security (IPsec), etc.

Example Video Tool

Figure 2:
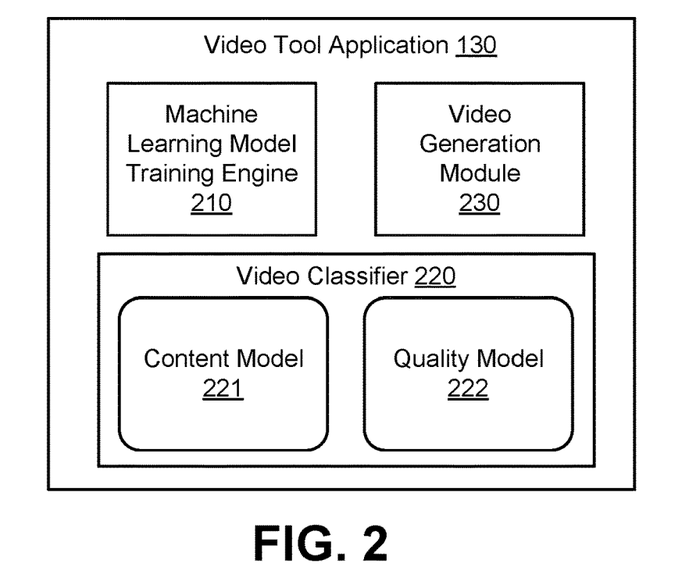
FIG. 2 is a block diagram of a video tool application, in accordance with at least one embodiment.

FIG. 2 is a block diagram of a video tool application 130, in accordance with at least one embodiment. The video tool application 130 includes a machine learning model training engine 210, a video classifier 220, and a video generation module 230. In some embodiments, the video tool application 130 includes modules other than those shown in FIG. 2 or fewer than those shown. For example, the video tool application 130 may exclude the training engine 210, whose functions may be offloaded to a third-party server. In another example, although not depicted, the video tool application 130 may include a rendering module to provide the AR objects rendered by the AR engine 120 to the mobile client 100. Further, the modules, engines and/or models described herein may be embodied as program code (e.g., software comprised of instructions stored on non-transitory computer readable storage medium and executable by at least one processor such as the processor 702 in FIG. 7) and/or hardware (e.g., application specific integrated circuit (ASIC) chips or field programmable gate arrays (FPGA) with firmware. The modules, engines, and or models correspond to at least having the functionality described when executed/operated.

The video tool application 130 receives a set of image frames from a mobile client. While images are referenced with respect to the description of the video tool application 130, the functions are not limited to images (e.g., media files of PNG or JPEG format) described herein and are equally applicable to videos (e.g., media files of MP4 format). Furthermore, the terms "image" and "image frame" may be used interchangeably herein. Each received image frame may include image data displayed on the mobile client (e.g., the mobile client 100). The image data displayed on the mobile client may include raw image data without layers of one or more AR objects composited with the raw image layer. The image data displayed on the mobile client may include composite image data including both raw image data and AR object data. In some embodiments, the video classifier 220 of the video tool application 130 receives the set of image frames for processing (e.g., classifying the image frames) using one or more trained models.

The machine learning model training engine 210 may train machine learning models to classify images or videos depicting the user's interactions with the AR client 101. The training engine 210 may apply training data sets to the content model 221 or the quality model 222. The training engine 210 may create training data sets based on the data from the database 140. For example, the training data sets may be created using images received from the mobile client 100 (e.g., the AR client 101) during operation of the AR client 101. The training data sets may include positive or negative samples of real-world objects or AR objects. The training data sets may be labeled according to the presence, or lack thereof, of a real-world object or AR object. The training engine 210 may receive the labels from a user (e.g., a user managing the video tool application 130 or a user of the mobile client 100).

The machine learning model training engine 210 may train a machine learning model in multiple stages. In a first stage, the training engine 210 may use generalized data representing the content or quality of an image frame. For example, the training engine 210 uses various images of a given quality score collected from multiple mobile clients to train the quality model 222 in the first stage. In a second stage, the training engine 210 may use user-specific data representing the content or quality of an image frame as captured by the of mobile client 100 to further optimize the classification performed by the video classifier 220 to a specific user. For example, the training engine 210 uses images of the given quality score collected from the mobile client 100 such that the quality score is optimized to the user's specification of what image features warrant a particular quality score. The video classifier 220 may prompt the user of mobile client 100 to provide a quality score for one or more image frames and store the user-specified quality scores and the corresponding image frames into the database 140 to train the quality model 222 in the second stage.

The machine learning model training engine 210 may train the content model 221 using training image data representative of real-world objects and AR objects (e.g., generated by the AR engine 120). The training engine 210 may generate the training image data for the content model 221 using image data labeled with one or more labels corresponding to objects within the respective image. This way, the content model 221 may be configured to classify real-world and AR objects within image frames. In some embodiments, the training engine 210 receives labels (e.g., for objects and quality scores) and applies the labels to the image data. The training engine 210 may use one set of image frames to train both the content model 221 and the quality model 222 or may use separate sets of image frames. For example, the training engine 210 may use image frames depicting real-world objects to train the content model 221 and use another set of image frames (e.g., received from the AR client 101 during operation of the AR client 101) that depict real-world and AR objects to train the quality model 222.

The machine learning model training engine 210 may train the quality model 222 using training image data representative of a user-specified quality score. The training engine 210 may generate the training image data for the quality model 222 using image data labeled with a label corresponding to the user-specified quality score. In some embodiments, the training engine 210 determines the quality score to label the image data for training. The training engine 210 may determine the quality score for an image based on the content within the image, as classified by the content model 221. In some embodiments, the content model 221 classifies a particular AR object and the training engine 210 determines that the particular AR object corresponds to a particular quality score. The training engine 210 may access statistics that reflect quality corresponding to the AR object such the frequency of appearances of the object during use of AR applications (e.g., during AR gameplay), which may be an implicit user-determined feature (i.e., the user was not necessarily prompted by the video tool application 130 to indicate the quality of the AR object). Alternatively or additionally, the training engine 210 may determine, based on previously-received user-specified quality scores for images where the particular AR object was classified, that subsequent images with the same AR object should be labeled with the corresponding, historical user-specified quality score.

The machine learning model training engine 210 may re-train the machine learning models to optimize the classifications. For example, the training engine 210 may periodically re-train the quality 222 model using user-scored images (e.g., images that users have provided a quality score for) as users of the AR client 101 interact over time and more images are gathered to be scored.

Video classifier 220 may receive a set of image frames to apply to one or more of the content model 221 and the quality model 222. In some embodiments, the video classifier 220 applies the content model 221 to the received set of images frames to classify objects depicted within the image frames. The video classifier 220 determines, based on the classifications by the content model 221, a first subset of the image frames that include image data associated with one or more real-world objects and/or AR objects (e.g., generated by the AR engine 120). The video classifier 220 may discard image frames that are not in the first subset of image frames, reserving storage space for other image frames (e.g., image frames classified by the content model 221 as having a particular object). In some embodiments, the video classifier 220 may use the classifications from the content model 221 to determine which image frames from the received set of image frames are to be included in the first subset of image frames. For example, the video classifier 220 uses a predetermined list of objects that should not be included within generated videos and discards image frames classified as containing one or more of the objects in the pre-determined list.

The video classifier 220 may apply the first subset of the image frames to the quality model 222 to classify a quality score for each of the first subset's image frames. The video classifier 220 may use the classifications by the quality model 222 to select another subset of image frames from the first subset (i.e., a second subset). The video classifier 220 provides the second subset of image frames to the video generation module 230 to generate a video that includes the second subset of image frames. For example, the video generation module 230 generates a highlight video of a user's AR gameplay showing image frames that have high quality scores and include one or more particular objects. In some embodiments, the video classifier 220 may apply the received images to the quality model 222 before applying the content model 221 (e.g., to a subset of images classified by the quality model 222 to be a particular quality score).

The content model 221 and the quality model 222 may be machine learning models. The models 221 and 222 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

The content model 221 is trained to classify objects within image frames. The image frames may be composite image frames including both raw image data and AR image data. As referred to herein, "objects" includes one or more of real-world or AR objects. The content model 221 is trained using images of one or more objects (e.g., by the machine learning model training engine 210). For example, the content model 221 classifies an AR ball and a user's hand within an image frame. The content model 221 may determine a confidence score associated with the classification. In some embodiments, the content model 221 may use a confidence score threshold to determine whether a given classification is accurate (e.g., the confidence score must be over 90%, else the content model 221 does not classify a particular object as being in an image frame).

The quality model 222 is trained to classify an image frame as having a quality score in a range of quality scores. In some embodiments, the quality model 222 may determine classify the image frames using numerical quality scores on a scale from, for example, one to three. The content model 221 is trained using images of one or more objects (e.g., by the machine learning model training engine 210). The quality model 222 may receive an image frame as input and output a quality score indicative of features of the image frame (e.g., brightness, contrast, etc.). For example, the quality model 222 may be trained on images with varying contrast, where ranges of contrast correspond to respective quality scores (e.g., an image with minimal contrast is labeled with a low quality score of "3"). In this example, the quality model 222 may receive an image captured by the camera 103 with insufficient contrast (e.g., as determined by the color value of the pixels and the relative color values compared with adjacent pixels within the image) and outputs, based on the training data, an quality score of "3." The video classifier 220 may rank the image frames based on the classifications by the quality model 222 (e.g., ranking image frames from highest to lowest quality based on the scores from "1" to "3").

The video generation module 230 generates a video including one or more of the received image frames. In particular, the video generation module 230 may generate the video to include the frames classified by the video classifier 220 to meet criteria such as depicting particular objects or having a particular quality score. In some embodiments, the video generation module 230 uses composite images as received from the mobile client 100 to generate the video. The video generation module 230 may provide the generated video for display at the mobile client.

Additionally or alternatively, the video generation module 230 generates the composite images based on the raw image data and the AR image data. The video generation module 230 may receive a set of image frames from the video classifier 220. For each image frame, the video generation module 230 may access a pixel buffer, generate an image from the pixel buffer, and modify the image generated from the pixel buffer such that the modified image appears as the image data displayed on a mobile client. The pixel buffer may contain raw image data as recorded by the camera 103 of the mobile client 100. The generated image from the pixel buffer may be a raw image. The video generation module 230 modifies the raw image by, for example, compositing the raw image data with AR image data to generate the image as was presented to the user while he was interacting with the AR client 101.

In one example, the video generation module 230 may iterate through each image frame of the subset of frames classified by the video classifier 220 as depicting a user's hand and an AR ball and having a quality score of "1." For each image frame, the video generation module 230 accesses a pixel buffer (e.g., at the database 140, the mobile client 100, or locally stored) to generate raw images of the user's hand as the user was interacting with the AR client 101, as captured by the camera 103. The video generation module 230 modifies each of the raw images to composite an AR object over the raw image (e.g., an AR ball that the user was controlling using hand gestures). The modifications may include scaling the raw image and/or the AR object and filtering out noise within the raw image. In some embodiments, the video generation module 230 does not necessarily modify each of the raw images (e.g., where there is no AR object, the video generation module 230 may not have AR image data to composite). The video generation module 230 compiles the modified images into a video and transmits the generated video to the mobile client 100 for display (e.g., on the screen 103).

Processes for Generating Videos Using an AR Video Tool

Figure 3:
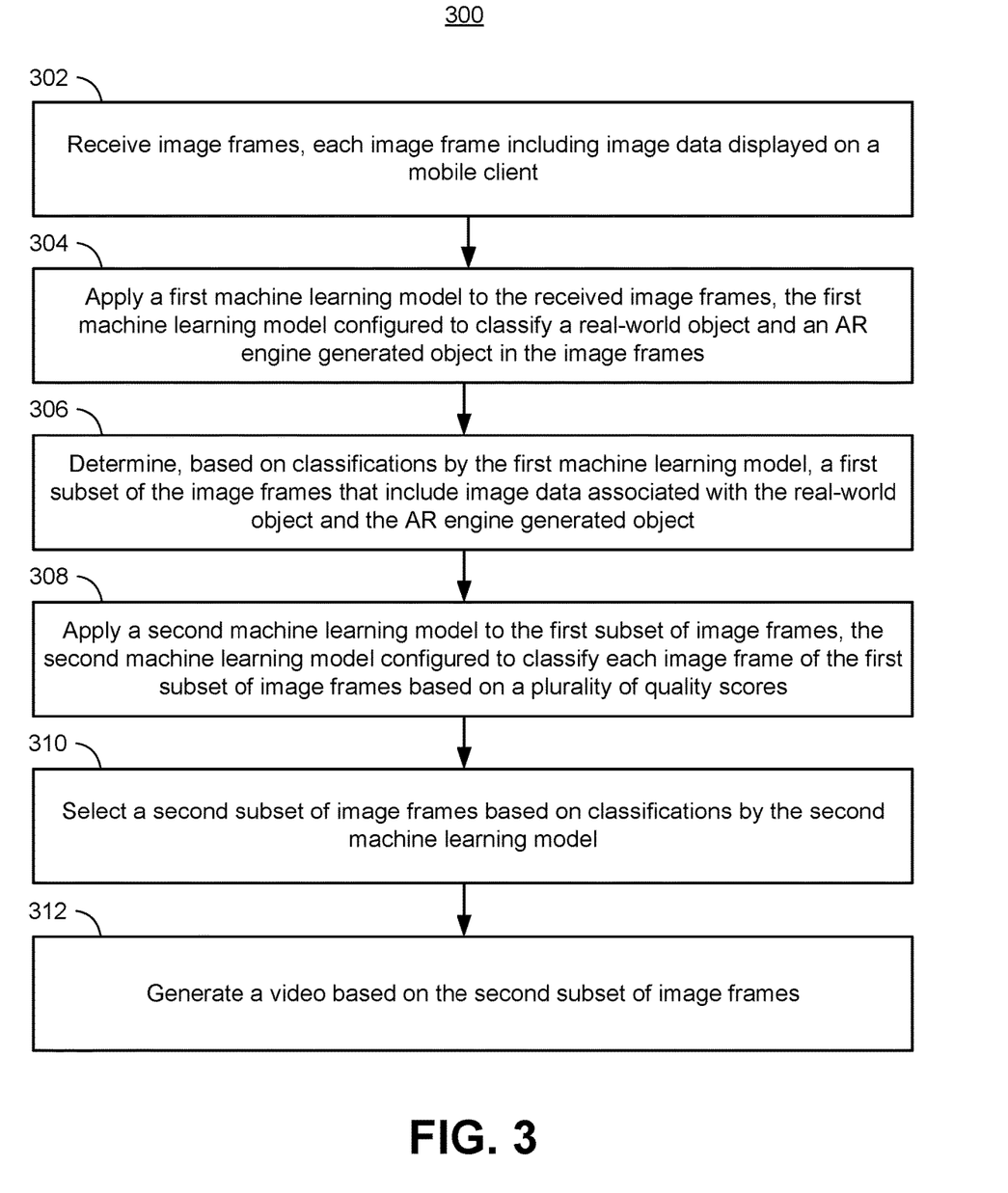
FIG. 3 is a flowchart illustrating a process for classifying image frames for generating a video, in accordance with at least one embodiment.

FIG. 3 is a flowchart illustrating an example process 300 for classifying image frames for generating a video, in accordance with at least one embodiment. The process 300 may be performed by the video tool application 130. The video tool application 130 may perform operations of the process 300 in parallel or in different orders, or may perform different, additional, or fewer steps. For example, the video tool application 130 may apply 308 the second machine learning model to determine 308 a subset of images based on quality before applying 304 the first machine learning model to determine 306 a smaller subset based on content.

The video tool application 130 receives 302 image frames, where each image frame includes image data displayed on a mobile client (e.g., the mobile client 100). The image data may include raw image data or digital multimedia container format image data (e.g., MP4) composited with AR data. The AR data may include an AR object as rendered by the AR engine 210. The AR data may have been provided by the video tool application 130 to the AR client 101 on the mobile client 100 for display with the raw image data captured by the camera 103. In one example, the video classifier 220 of the video tool application 130 receives 302 image frames showing a user controlling an AR avatar (e.g., a virtual representation of the user) to travel between the floor of his living room to the surface of a table, where the AR avatar performs a dance. In some image frames, the user has the camera view in an orientation that is very zoomed in (e.g., 90% of each of these image frames occupied by carpet and the remaining 10% occupied by portions of the AR avatar such as a shoe).

The video tool application 130 applies 304 a first machine learning model to the received image frames, where the first machine learning model is configured to classify a real-world object and an AR engine generated object in the received image frames. The video classifier 220 may apply 304 the content model 221 to the received image frames. The content model 221 may classify objects within the image frames. Continuing the previous example, the content model 221 classifies the AR avatar and the table in a first subset of the received image frames depicting the AR avatar traveling from the floor to the table. For the image frames where the user had zoomed in with the camera and failed to capture the full body of the AR avatar, the content model 221 may not classify the AR avatar or table.

The video tool application 130 determines 306, based on classifications by the first machine learning model, a first subset of the image frames that include image data associated with the real-world object and the AR engine generated object. The video classifier 220 may determine 306 that the first subset of image frames are those with the table and the AR avatar, as classified by the content model 221. The video classifier 220 may discard the image frames that the content model 221 fails to classify an object (e.g., where the user had zoomed in with the camera and failed to capture the full body of the AR avatar).

The video tool application 130 applies 308 a second machine learning model to the first subset of image frames, the second machine learning model configured to classify each image frame of the first subset of image frames based on a plurality of quality scores. The video classifier 220 may apply 308 the quality model 222 to the first subset of image frames determined 306 based on the content model 221. For example, the quality model 222 classifies the image frames depicting the AR avatar dancing on the table using a score of "1," a high quality score, based on training data generated from user-scored videos where dancing avatars were scored highly.

The video tool application 130 selects 310 a second subset of image frames based on classifications by the second machine learning model. The video classifier 220 may select 310 the second subset of image frames having quality scores above a threshold quality score or having a specific score (e.g., the highest score). For example, the video classifier 220 selects image frames showing the AR avatar dancing on the table because the quality model 222 classified them using the quality score of "1" out of three possible scores, where "1" was the highest score indicating highest quality.

The video tool application 130 generates 312 a video based on the second subset of image frames. The video generation module 230 generates 312 a video that includes the second subset of image frames. For example, the video generation module 230 generates a video of the AR avatar dancing by compositing the raw image data of the table with the AR data of the AR avatar dancing (e.g., as rendered by the AR engine 120). The video generation module 230 may provide the generated video to the mobile client 100 for display or to the media platform 150 for access by mobile clients within the AR system 110.

Figure 4:
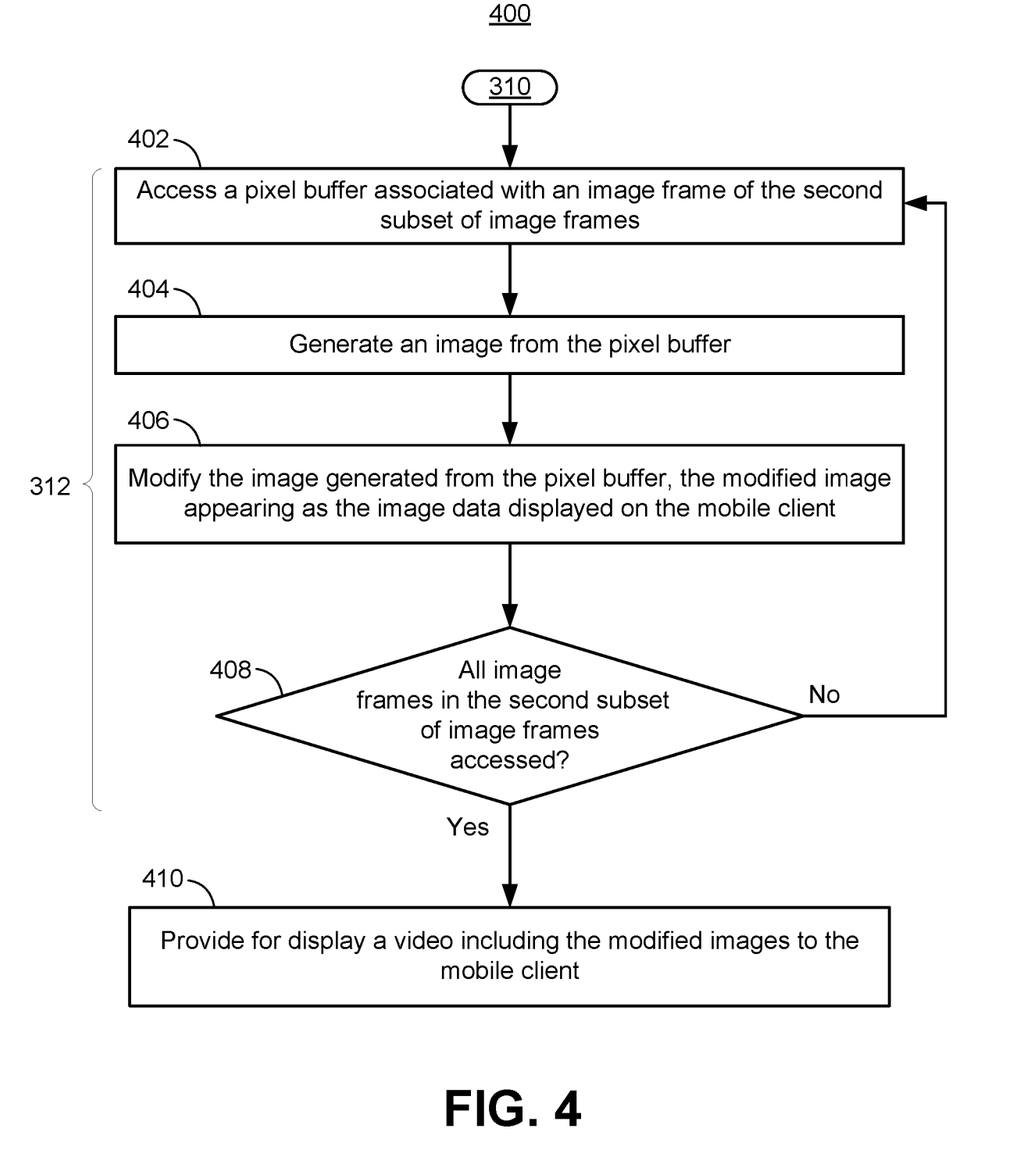
FIG. 4 is a flowchart illustrating a process for generating a video, in accordance with at least one embodiment.

FIG. 4 is a flowchart illustrating a process 400 for generating a video, in accordance with at least one embodiment. Portions of the process 400 may be subprocesses of the process 300. For example, the generation 312 of a video based on the second subset of image frames of the process 300 is expanded into various operations as shown in the process 400. Portions of the process 400 may continue from or segue into operations in the process 300. Like the process 300, the process 400 may be performed by the video tool application 130. The video tool application 130 may perform operations of the process 400 in parallel or in different orders, or may perform different, additional, or fewer steps.

The video tool application 130 accesses 402 a pixel buffer associated with an image frame of the second subset of image frames of the process 300. The pixel buffer may contain raw image data as captured by the camera 103 of the mobile client 100. The pixel buffer may be stored locally at the video tool application or remotely at the mobile client 100 or the database 140. The video generation module 230 may access 402 the pixel buffer. Continuing the example as described with respect to the process 300, the video generation module 230 may access a pixel buffer associated with one of the second subset of image frames that show the AR avatar dancing on the table.

The video tool application 130 generates 404 an image from the pixel buffer. For example, the video generation module 230 may generate 404 a raw image from the data in the pixel buffer showing a single frame of the AR avatar dancing.

The video tool application 130 modifies 406 the image generated from the pixel buffer, where the modified image appears as the image data displayed on the mobile client. The video generation module 230 may modify the image by compositing the raw image data from the pixel buffer with AR data as specified by the AR engine 120 that renders the AR avatar for the video tool application 130 to display at the AR client 101. The video generation module 230 may further modify the image by applying one or more image processing techniques to the image data such as filtering out noise in the image or scaling the image to a different size. In one example, the video generation module 230 modifies the image of the table generated from the pixel buffer so that the AR avatar is overlaying the table (e.g., a frame in which the AR avatar is in a dancing position).

The video tool application 130 determines 408 whether all image frames in the second subset of image frames have been accessed. The video generation module 230 sequentially iterate through image frames in the second subset in a chronological order (e.g., the order in which the images frames were recorded by the mobile client 110). If the video classifier 220 has reached the final image frame of the second subset of image frames, the process 400 proceeds to providing 410 the modified images in a video for display. Otherwise, the process 400 returns to access 402 a pixel buffer associated with another image frame in the second subset of image frames no continue working through the process 400.

The video tool application 130 provides 410 for display a video including the modified images to the mobile client. The video generation module 230 may stitch the second subset of image frames together to create a video, which it may transmit over the network 160 to the mobile client 100 for display on the screen 103. Alternatively or additionally, the video generation module 230 may transmit the video to the media platform 150 for access by other mobile clients in the AR system 110.

Example Video Classification and Generation in an AR System

FIG. 5 illustrates an example of video classification 500 in an AR system as disclosed, in accordance with at least one embodiment. The operations of the video classification 500 may be performed by the video tool application 130. The video classifier 220 may access the image frames 510 from the database 140. In some embodiments, the video classifier 220 receives image frames from the mobile client 100 to classify. The image frames 510 depict real-world and AR objects (e.g., a user's hand and an AR ball). The video classifier 220 applies a content model 221 to the image frames 510, where the content model classifies the objects in the image frames. The video classifier 220 may use these classifications to determine a first subset of the frames that depict one or more of the objects. The video classifier 220 may discard image frames 520 based on the classifications from the content model 221. For example, the video classifier 220 discards an image frame that did not depict the user's hand.

The video classifier 220 may apply a quality model 222 to the first subset of image frames. The video classifier 220 receives the classifications by the quality model 222 that assign a quality score to each of the image frames of the first subset of image frames. The video classifier 220 may rank the image frames classified by the quality model 222. The ranked image frames 530 may include a first set of ranked images 531 that the quality model 222 has classified using a quality score of "1," a second set of ranked images 532 that the quality model 222 has classified using a quality score of "2," and a third set of ranked images 533 that the quality model 222 has classified using a quality score of "3." In this example, the quality score of "1" may correspond to the highest quality image (e.g., sufficiently contrasted, bright, having objects that other users have rated highly, etc.).

FIG. 6 illustrates an example of video generation 600 in an AR system, in accordance with at least one embodiment. The operations of the video generation 600 may be performed by the video tool application 130. The video generation 600 may follow the video classification 500. The video classifier 220 may provide the first set of ranked images 531 to the video generation module 230. The video generation module 230 may, for each of the image frames in the first set of ranked images 531, access a pixel buffer, generate an image from the pixel buffer, and modify the generated image (e.g., composite raw image data with AR data, filter noise, etc.). The video generation module 230 may generate a video 610 using the modified images and transmit the video 610 to the mobile client 100 for display. FIGS. 5 and 6 depict the video classifier 220 selecting images having both a user's hand and an AR ball within a field of view of the mobile client 100's camera for assembly into the video 610 to play back (e.g., a highlight video). Accordingly, the disclosed video tool application 130 allows for the generation of a video, based on classifications of content and quality within the image frames, for which conventional AR systems lack functionality.

Computing Machine Architecture

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may correspond to functional configuration of the modules and/or processes described with FIGS. 1-6. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a portable computing device or machine (e.g., smartphone, tablet, wearable device (e.g., smartwatch)) capable of executing instructions 624 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

While using an AR client, or after using the AR client, a user may want to play back the interactions he has made with an AR object. In particular, the user may want to avoid playing back portions of his interactions that lack particular content (e.g., the user's hand or AR objects) or were of relatively poor quality (e.g., an object briefly blocked the AR object from the user's view or the user traveled to a poorly lit room and the images are insufficiently bright). In this way, the user could be provided a video highlighting select portions of his interactions with the AR client. Conventional implementations for mobile clients do not allow for the generation of a video based on classifications of content and quality within the image frames. The methods described herein enable the classification of image frames and the generation of a video using the classified image frames on mobile client rendered AR systems without consuming excessive amounts of processing power, thus presenting an immersive AR experience to the user.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating a video based on content and quality of image frames in an augmented reality system executed on a mobile client through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium comprising stored instructions, the instructions when executed by a processor cause the processor to:

receive a set of image frames, each image frame comprising image data displayed on a mobile client;
apply a first machine learning model to the received set of image frames, the first machine learning model trained on training image data representative of a plurality real-world objects and a plurality of augmented reality (AR) engine generated objects, the first machine learning model configured to classify a real-world object and an AR engine generated object in the set of image frames;
determine, based on classifications by the first machine learning model, a first subset of the image frames that comprise image data associated with the real-world object and the AR engine generated object;
apply a second machine learning model to the first subset of the image frames, the second machine learning model configured to classify each image frame of the first subset of the image frames based on a plurality of quality scores;
select a second subset of the image frames based on classifications by the second machine learning model;
for each image frame of the second subset of the image frames:
  access a pixel buffer,
  generate an image from the pixel buffer, and
  modify the image generated from the pixel buffer, the modified image appearing as the image data displayed on the mobile client; and
generate a video comprising the modified images associated with the second subset of the image frames.

2. The non-transitory computer readable storage medium of claim 1, wherein the instructions further comprise instructions that when executed by the processor cause the processor to train the first machine learning model using the training image data representative of the plurality real-world objects and the plurality of AR engine generated objects.

3. The non-transitory computer readable storage medium of claim 1, wherein the set of image frames is a first set of image frames, and wherein the instructions further comprise instructions that when executed by the processor cause the processor to:
receive a second set of image frames;
apply respective labels to the second set of image frames, each of the respective labels indicating a respective quality score of the plurality of quality scores; and
train the second machine learning model using the labeled second set of image frames.

4. The non-transitory computer readable storage medium of claim 3, wherein the second set of image frames are received from an AR client during user operation of the AR client.

5. The non-transitory computer readable storage medium of claim 3, wherein the instructions further comprise instructions that when executed by the processor cause, for each image frame of the second set of image frames, the processor to:
receive a user-specified quality score of the plurality of quality scores; and
determine a corresponding label based on the user-specified quality score.

6. The non-transitory computer readable storage medium of claim 1, wherein the plurality of quality scores are associated with at least one of a presence of the real-world object in a given image frame of the set of image frames, a presence of the AR engine generated object in the given image frame, the presence of the AR engine generated object in consecutive image frames of the set of image frames, or a distance between the AR engine generated object and the real-world object in the given image frame.

7. The non-transitory computer readable storage medium of claim 1, wherein the set of image frames are received from an AR client during user operation of the AR client.

8. The non-transitory computer readable storage medium of claim 1, wherein instructions to modify the image generated from the pixel buffer further comprise instructions that when executed by the processor cause the processor to overlay the AR engine generated object on to the image generated from the pixel buffer.

9. The non-transitory computer readable storage medium of claim 1, wherein the instructions further comprise instructions that when executed by the processor cause the processor to transmit the generated video to a mobile client.

10. The non-transitory computer readable storage medium of claim 1, wherein the AR engine rendered object is rendered by a game engine.

11. A computer-implemented method comprising:
receiving a set of image frames, each image frame comprising image data displayed on a mobile client;
applying a first machine learning model to the received set of image frames, the first machine learning model trained on training image data representative of a plurality real-world objects and a plurality of augmented reality (AR) engine generated objects, the first machine learning model configured to classify a real-world object and an AR engine generated object in the set of image frames;
determining, based on classifications by the first machine learning model, a first subset of the image frames that comprise image data associated with the real-world object and the AR engine generated object;
applying a second machine learning model to the first subset of the image frames, the second machine learning model configured to classify each image frame of the first subset of the image frames based on a plurality of quality scores;
selecting a second subset of the image frames based on classifications by the second machine learning model;
for each image frame of the second subset of the image frames:
accessing a pixel buffer,
generating an image from the pixel buffer, and
modifying the image generated from the pixel buffer, the modified image appearing as the image data displayed on the mobile client; and
generating a video comprising the modified images associated with the second subset of the image frames.

12. The computer-implemented method of claim 11, wherein the set of image frames is a first set of image frames, further comprising:
receiving a second set of image frames;
applying respective labels to the second set of image frames, each of the respective labels indicating a respective quality score of the plurality of quality scores; and
training the second machine learning model using the labeled second set of image frames.

13. The computer-implemented method of claim 12, further comprising, for each image frame of the second set of image frames:
receiving a user-specified quality score of the plurality of quality scores; and
determining a corresponding label based on the user-specified quality score.

14. The computer-implemented method of claim 11, wherein the plurality of quality scores are associated with at least one of a presence of the real-world object in a given image frame of the set of image frames, a presence of the AR engine generated object in the given image frame, the presence of the AR engine generated object in consecutive image frames of the set of image frames, or a distance between the AR engine generated object and the real-world object in the given image frame.

15. The computer-implemented method of claim 11, wherein the set of image frames are received from an AR client during user operation of the AR client.

16. A system comprising:
a video classifier configured to:
receive a set of image frames, each image frame comprising image data displayed on a mobile client;
apply a first machine learning model to the received set of image frames, the first machine learning model trained on training image data representative of a plurality real-world objects and a plurality of augmented reality (AR) engine generated objects, the first machine learning model configured to classify a real-world object and an AR engine generated object in the set of image frames;
determine, based on classifications by the first machine learning model, a first subset of the image frames that comprise image data associated with the real-world object and the AR engine generated object;
apply a second machine learning model to the first subset of the image frames, the second machine learning model configured to classify each image frame of the first subset of the image frames based on a plurality of quality scores; and
select a second subset of the image frames based on classifications by the second machine learning model; and
a video generation module configured to:
for each image frame of the second subset of the image frames:
access a pixel buffer,
generate an image from the pixel buffer, and
modify the image generated from the pixel buffer, the modified image appearing as the image data displayed on the mobile client; and
generate a video comprising the modified images associated with the second subset of the image frames.

17. The system of claim 16, wherein the set of image frames is a first set of image frames, further comprising:
receiving a second set of image frames;
applying respective labels to the second set of image frames, each of the respective labels indicating a respective quality score of the plurality of quality scores; and
training the second machine learning model using the labeled second set of image frames.

18. The system of claim 17, further comprising, for each image frame of the second set of image frames:
receiving a user-specified quality score of the plurality of quality scores; and
determining a corresponding label based on the user-specified quality score.

19. The system of claim 16, wherein the plurality of quality scores are associated with at least one of a presence of the real-world object in a given image frame of the set of image frames, a presence of the AR engine generated object in the given image frame, the presence of the AR engine generated object in consecutive image frames of the set of image frames, or a distance between the AR engine generated object and the real-world object in the given image frame.

20. A computer-implemented method comprising:
- receiving a set of image frames, each image frame comprising image data displayed on a mobile client;
- applying a first machine learning model to the received set of image frames, the first machine learning model configured to classify a real-world object and an AR engine generated object in the set of image frames;
- determining, based on classifications by the first machine learning model, a first subset of the image frames that comprise image data associated with the real-world object and the AR engine generated object;
- applying a second machine learning model to the first subset of the image frames, the second machine learning model configured to classify each image frame of the first subset of the image frames based on a plurality of quality scores;
- selecting a second subset of the image frames based on classifications by the second machine learning model; and
- generating a video based on the second subset of the image frames.

* * * * *